United States Patent
Solomon et al.

(10) Patent No.: US 9,466,398 B2
(45) Date of Patent: Oct. 11, 2016

(54) CERAMIC-CERAMIC COMPOSITES AND PROCESS THEREFOR, NUCLEAR FUELS FORMED THEREBY, AND NUCLEAR REACTOR SYSTEMS AND PROCESSES OPERATED THEREWITH

(71) Applicants: Purdue Research Foundation, West Lafayette, IN (US); The Texas A&M University System, College Station, TX (US)

(72) Inventors: Alvin A. Solomon, West Lafayette, IN (US); Huthavahana S. Kuchibhotla, West Lafayette, IN (US); Shripad T. Revankar, West Lafayette, IN (US); Sean Marshall McDeavitt, Bryan, TX (US); Jean Concetto Ragusa, College Station, TX (US)

(73) Assignees: Purdue Research Foundation, West Lafayette, IN (US); The Texas A&M University System, College Station, TX (US)

( * ) Notice: Subject to any disclaimer, the term of this patent is extended or adjusted under 35 U.S.C. 154(b) by 188 days.

(21) Appl. No.: 13/849,117

(22) Filed: Mar. 22, 2013

(65) Prior Publication Data
US 2014/0183765 A1    Jul. 3, 2014

Related U.S. Application Data

(63) Continuation of application No. PCT/US2011/053473, filed on Sep. 27, 2011.

(60) Provisional application No. 61/386,848, filed on Sep. 27, 2010.

(51) Int. Cl.
| | | |
|---|---|---|
| *G21C 21/02* | (2006.01) | |
| *C04B 35/626* | (2006.01) | |
| *C04B 35/64* | (2006.01) | |
| *G21C 3/62* | (2006.01) | |
| *C04B 35/51* | (2006.01) | |
| *C04B 35/622* | (2006.01) | |
| *C04B 35/628* | (2006.01) | |

(52) U.S. Cl.
CPC ............... *G21C 21/02* (2013.01); *C04B 35/51* (2013.01); *C04B 35/6261* (2013.01); *C04B 35/6281* (2013.01); *C04B 35/62204* (2013.01); *C04B 35/62695* (2013.01); *G21C 3/623* (2013.01); *C04B 2235/32* (2013.01); *C04B 2235/3205* (2013.01); *C04B 2235/528* (2013.01); *C04B 2235/5427* (2013.01); *C04B 2235/6582* (2013.01); *C04B 2235/77* (2013.01); *Y02E 30/38* (2013.01)

(58) Field of Classification Search
CPC .. G21C 21/02; G21C 3/623; C04B 35/6281; C04B 35/62204; C04B 35/51; C04B 35/62695; C04B 35/6261
USPC ..................... 264/601; 252/638, 643, 636
See application file for complete search history.

(56) References Cited

U.S. PATENT DOCUMENTS

| | | | | |
|---|---|---|---|---|
| 3,166,614 A | * | 1/1965 | Taylor ...................... | G21C 3/06 264/0.5 |
| 4,383,953 A | | 5/1983 | Larson et al. | |
| 4,478,787 A | * | 10/1984 | Nadkarni ............... | B22F 3/1216 219/145.1 |
| 4,575,436 A | * | 3/1986 | Larson ................... | G21C 3/623 252/639 |
| 4,643,873 A | | 2/1987 | Hayes | |
| 4,670,198 A | * | 6/1987 | Larson .................... | C04B 35/51 252/637 |
| 4,816,187 A | * | 3/1989 | Larson .................... | C04B 35/51 252/625 |
| 5,180,527 A | | 1/1993 | Hirai et al. | |
| 5,255,299 A | | 10/1993 | Hirai et al. | |
| 5,762,831 A | | 6/1998 | Viallard et al. | |
| 2007/0095536 A1 | * | 5/2007 | Vinegar ................. | C10G 1/002 166/302 |
| 2009/0260823 A1 | * | 10/2009 | Prince-Wright ....... | C10G 21/22 166/302 |

| | | | | |
|---|---|---|---|---|
| 2011/0127473 | A1* | 6/2011 | Hanus | G21F 9/30 252/643 |
| 2011/0194666 | A1* | 8/2011 | Walters | G21C 3/04 376/416 |
| 2014/0153688 | A1* | 6/2014 | Zabiego | G21C 3/06 376/409 |

FOREIGN PATENT DOCUMENTS

| | | |
|---|---|---|
| JP | 05-196770 | 8/1993 |
| JP | 2007-101425 | 4/2007 |
| JP | 5527942 | 11/2009 |
| KR | 20060093177 | 8/2006 |

OTHER PUBLICATIONS

K.H. Sarma, et al., "New Processing Methods to Produce Silicon Carbide and Beryllium Oxide Inert Matrix and Enhanced Thermal Conductivity Oxide Fuels", Journal of Nuclear Materials, vol. 352, No. 1-3.

G.P. Akishin, S.K. Turnaev, V. Ya. Vaispapir, M.A. Gorbunova, Yu. N. Makurin, V.S. Kiiko, and A. L. Ivanovskii; Thermal Conductivity of Beryllium Oxide Ceramic, Refractories and Industrial Ceramics 2009; vol. 50, No. 6., pp. 465-468, Dec. 31, 2009.

* cited by examiner

Primary Examiner — Joseph S Del Sole
Assistant Examiner — Nahida Sultana
(74) Attorney, Agent, or Firm — Hartman Global IP Law; Gary M. Hartman; Domenica N.S. Hartman (57) ABSTRACT

A process of producing ceramic-ceramic composites, including but not limited to nuclear fuels, and composites capable of exhibiting increased thermal conductivities. The process includes milling a first ceramic material to produce a powder of spheroidized particles of the first ceramic material, and then co-milling particles of a second ceramic material with the spheroidized particles of the first ceramic material to cause the particles of the second ceramic material to form a coating on the spheroidized particles of the first material. The spheroidized particles coated with the particles of the second ceramic material are then compacted and sintered to form the ceramic-ceramic composite, in which the second ceramic material forms a continuous phase completely surrounding the spheroidized particles of the first ceramic material.

17 Claims, 6 Drawing Sheets

CERAMIC-CERAMIC COMPOSITES AND PROCESS THEREFOR, NUCLEAR FUELS FORMED THEREBY, AND NUCLEAR REACTOR SYSTEMS AND PROCESSES OPERATED THEREWITH

CROSS REFERENCE TO RELATED APPLICATIONS

This application claims the benefit of International Application No. PCT/US2011/053473, filed Sep. 27, 2011, having a claim of priority to U.S. Provisional Application No. 61/386,848, filed Sep. 27, 2010, the contents of which are incorporated herein by reference.

BACKGROUND OF THE INVENTION

The present invention generally relates to nuclear power generation materials, systems and processes, and more particularly to the modification of uranium dioxide ($UO_2$) nuclear fuels to increase their thermal conductivity.

Commercial light-water reactors currently use pellets of pure or burnable poison-doped uranium dioxide ($UO_2$) as a nuclear fuel. Though uranium dioxide has demonstrated many desirable characteristics, it has a relatively low thermal conductivity that leads to the development of a large temperature gradient across the fuel pellet. This temperature gradient and the consequent high centerline temperatures limit the operational performance of a nuclear reactor due to overheating, melting, and effects such as thermal stresses that cause pellet cladding interaction and the release of fission product gases.

High fuel temperatures can be decreased and reactor performance improved by developing nuclear fuels having enhanced thermal conductivities. A high thermal conductivity nuclear fuel would decrease fuel temperatures and facilitate a reduction in pellet/cladding interaction through lessening thermal stresses that result in fuel cracking, relocation, and swelling. Additionally, fission gas release could be decreased allowing for higher fuel burn-up, and reactor safety could be improved as a result of faster thermal responses and less stored energy in the fuel pins. Ultimately, higher conductivity may also permit more energy to be generated in the reactor.

The development of enhanced thermal conductivity two-phase ceramic-metallic (cermet) nuclear fuels has been explored in the past. Such efforts have included the examination of nuclear fuels in which $UO_2$, $UO_2$—$ThO_2$ or $UO_2$—$PuO_2$ ceramic particles are dispersed in a stainless steel or zirconium alloy matrix. Other investigated fuel forms have included aligned metal fibers dispersed in a ceramic fuel matrix. While these fuels have mainly focused on cermets that may not be chemically stable in $UO_2$ fuels that oxidize with burnup, other options have included the development of more stable ceramic-ceramic composites.

Ceramic-ceramic (cer-cer) nuclear fuels based on uranium dioxide are also capable of having increased effective thermal conductivities. In addition to having a higher thermal conductivity than uranium dioxide, the additive ceramic must also be chemically compatible with uranium dioxide and have a comparable melting point. Silicon carbide (SiC) and beryllium oxide (BeO; beryllia) are two high melting point and high conductivity ceramics that have been considered as additives to $UO_2$ fuels. However, SiC and $UO_2$ exhibit chemical interactions at temperatures as low as 1200° C., and rapid reactions occur at about 1400° C. On the other hand, the $UO_2$—BeO phase diagram shows that these two ceramic materials exist as solid equilibrium phases below about 2100° C. As such, $UO_2$ and BeO have been considered to be excellent candidates for fabricating two-phase ceramic nuclear fuels based on $UO_2$.

BeO has been reported to have thermal conductivities as high as 13.7 kW/m-K (at 45K) and about 370 to about 297 W/m-K (at 300K), which is about 93% that of copper at these temperatures. A high K value coupled with a high melting point and low thermal neutron absorption cross-section suggest that BeO would be an ideal material for the high conductivity phase in a nuclear fuel. In addition, BeO is close to being isotopically pure since the only naturally occurring Be isotope is Be-9 and natural oxygen is 99.8% $O_{16}$. BeO has also been reported to have excellent fission product retention capabilities, and irradiation performance up to certain fast neutron and fission fragment dose or micro-cracking, when used as a ceramic matrix material. A fine particle size in fabricated fuel pellets is desirable in order to avoid micro-cracking as a result of anisotropic radiation-induced swelling that has been reported to occur in BeO ceramics.

In view of the above, the use of BeO to enhance the thermal conductivity of $UO_2$ has been previously examined. For example, U.S. Pat. Nos. 5,180,527, 5,255,299, 5,362,426 and 5,429,775 to Hirai et al. and a technical paper authored by Ishimoto et al., Thermal Conductivity of $UO_2$—BeO Pellet, Journal of Nuclear Science and Technology, Vol. 33, No. 2, 1996, p 134-140, presented results evidencing a net increase in thermal conductivity with BeO in a $UO_2$-based nuclear fuel. The research appeared to demonstrate that a continuous BeO phase along $UO_2$ boundaries can yield high thermal conductivities. On the other hand, a discontinuous BeO phase can yield conductivities that are lower by a factor of about two. To achieve a continuous BeO phase, this prior work required heating the $UO_2$ fuel above its eutectic temperature of 2100° C., which is a process step that presents many practical problems on an industrial scale.

BRIEF DESCRIPTION OF THE INVENTION

The present invention provides a process for producing ceramic-ceramic composites, including nuclear fuels, and particularly to a process for increasing the thermal conductivity of a nuclear fuel through additions of a second material that exhibits a higher thermal conductivity than the base material of the nuclear fuel. The invention is particularly directed to increasing the thermal conductivity of uranium dioxide-based nuclear fuels through additions of BeO using a process that yields a controlled microstructure in the final multi-phase composite.

According to a first aspect of the invention, the process produces a ceramic-ceramic composite and comprises milling a first ceramic material to produce a powder of spheroidized particles of the first ceramic material, and then co-milling particles of a second ceramic material with the spheroidized particles of the first ceramic material to cause the particles of the second ceramic material to form a coating on the spheroidized particles of the first material. The spheroidized particles coated with the particles of the second ceramic material are then compacted and sintered to form the ceramic-ceramic composite in which the second ceramic material forms a continuous phase completely surrounding the spheroidized particles of the first ceramic material.

Another aspect of the invention is a nuclear fuel formed by a process comprising the steps described above.

Other aspects of the invention include nuclear reactor systems and processes that operate with the nuclear fuel.

A technical effect of the invention is the ability to enhance the thermal conductivity of ceramic nuclear fuels through advances in the science and processing of a ceramic fuel to have a controlled multi-phase microstructure. Though prior efforts involving the development of $UO_2$—BeO ceramic-ceramic nuclear fuels had yielded some success in enhanced thermal conductivity, the present invention is capable of achieving higher thermal conductivities by obtaining microstructures that exhibit high purities in separate $UO_2$ and BeO phases, as well as a desirable interface structure and contact between the phases. Controlled microstructures in the nuclear fuel are also capable of providing improved fission gas retention and resistance to radiation damage.

Other aspects and advantages of this invention will be better appreciated from the following detailed description.

DETAILED DESCRIPTION OF THE INVENTION

The present invention provides advancements in the science and process of producing ceramic nuclear fuels that exhibit relatively high thermal conductivities. As will be discussed below, the invention involves a process for producing multi-phase ceramic-ceramic nuclear fuels, and particularly $UO_2$-based nuclear fuels in which BeO is an additive ceramic phase that increases the effective thermal conductivity of the nuclear fuel. Preferred aspects of the invention make use of a three-dimensional (3-D) finite element method (FEM) to thermally model the fuel, by which thermal conductivities can be predicted as a guide to subsequent process optimization. Other preferred aspects of the invention include a practical fabrication process for producing pellets of the ceramic-ceramic fuel, by which the microstructure of the fuel is produced to have controlled particle size distributions and controlled volume fractions for the different ceramic phases. Compaction and sintering parameters used in the fabrication process can also be optimized using 3-D FEM analysis to control the microstructure of the fuel in order to obtain robust pellets having high thermal conductivities.

The invention builds on prior work reported by Sarma et al. in "New Processing Methods to Produce Silicon Carbide and Beryllium Oxide Inert Matrix and Enhanced Thermal Conductivity Oxide Fuels," Journal of Nuclear Materials, 352, 324-333 (2006). Sarma et al. considered various variables relating to the production of ceramic-ceramic $UO_2$-based nuclear fuels, including material variables such as volume fractions and particle sizes and process variables such as sintering temperatures, pellet pressing pressures for granulation and sintering, granulation and sieving methods, and the use of binders and pore formers. However, nuclear fuel pellets reported by Sarma et al. exhibited significant cross-contamination between the primary phase formed by $UO_2$ particles and the additive (BeO) phase intended to improve the thermal conductivity of the $UO_2$ particles, resulting in thermal conductivities that were significantly lower than had been analytically predicted. The present technology is capable of reducing cross-contamination by controlling the particle size distributions of the primary and additive phases, yielding controlled microstructures that were determined to be key for enhancement of thermal conductivity, as well as material characteristics that promote fission gas retention and resistance to radiation damage.

A particular aspect of the invention involves promoting the density of the nuclear fuel material (typically pellets) through the use of a co-sintering process in which sintering or shrinkage rates for the primary and additive phases are substantially equal. From prior sintering experiments performed on BeO and $UO_2$ powders, it has been observed that when compacted BeO—$UO_2$ pellets are sintered from the green stage there is a linear shrinkage of about 15.7% and about 18.8% in the BeO and $UO_2$ particles, respectively, which may lead to cracking and porosity development in the final fuel product. Consequently, one problem that must be overcome to achieve substantially equal sintering or shrinkage rates in BeO—$UO_2$ pellets is to obtain highly sinterable starting powders that exhibit sintering compatibilities that will result in both phases sintering to high densities. High densities in the primary $UO_2$ phase promote high fissile atom densities, and high densities in the additive BeO phase promote high thermal conductivities. Such compatibilities can be realized with nearly identical sintering curves (density vs. time) for the different phases.

Figure 1:
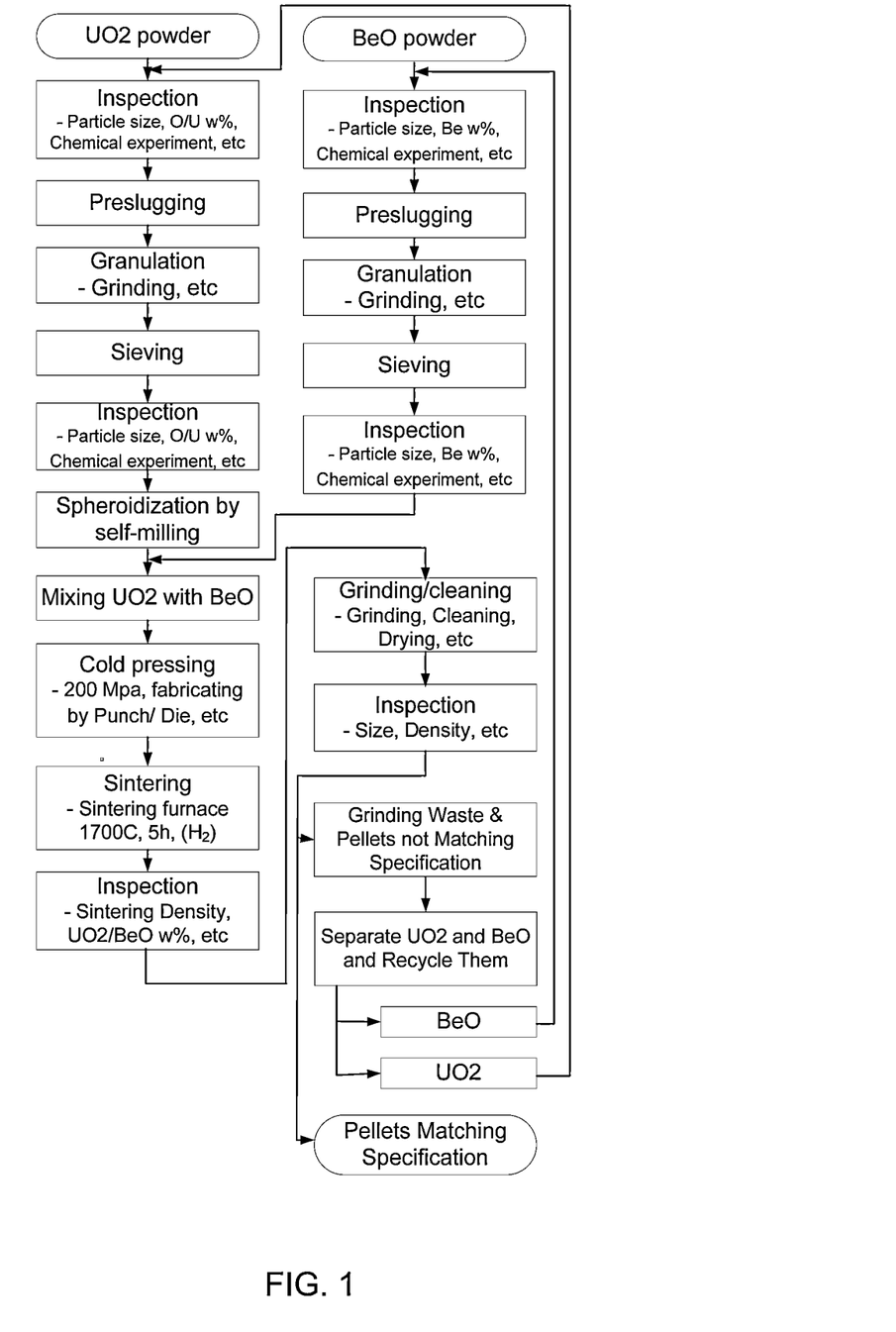
FIG. 1 is a flow chart describing a $UO_2$—BeO matrix fuel fabrication process in accordance with an embodiment of the present invention.

A preferred process is represented in FIG. 1 for fabricating high density nuclear fuels with desirable microstructures as described above. The process represented in FIG. 1 utilizes self-milling to spheroidize and smooth $UO_2$ particles and control their particle size distribution, and then subsequently co-milling BeO particles with the spheroidized $UO_2$ particles prior to compacting (pelletizing) and sintering the mixture in a reducing atmosphere. Spheroidizing of the $UO_2$ particles is believed to be a key to obtaining a highly sinterable $UO_2$ powder, and co-milling of the BeO particles and the spheroidized $UO_2$ particles is believed to be another key for achieving substantially equal sintering or shrinkage rates in BeO—$UO_2$ composites produced with the BeO and $UO_2$ particles. As with the milling step used to spheroidize the $UO_2$ particles, the preferred co-milling processes can also be referred to as self-milling processes, in that milling is performed without the use of any extraneous grinding media.

FIG. 1 evidences that parameters that are desired to be controlled include the volume fraction of the BeO particles, the size and size distribution of the $UO_2$ particles, the uniform coating of the $UO_2$ particles with the BeO particles, and the time and temperature profiles used during compaction and sintering. Even so, the process is sufficiently uncomplicated to enable scaling up for large-scale commercial systems.

Figure 2:
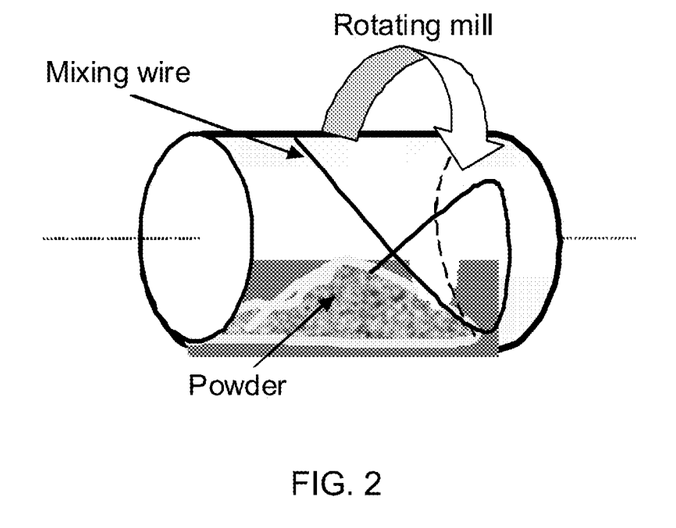
FIG. 2 schematically represents a ball-milling apparatus of a type suitable for performing a self-milling process in accordance with a preferred aspect of the invention.

FIG. 1 indicates that the $UO_2$ particles may first be pre-slugged (pelletized (e.g., punch and die compaction) and granulated (e.g., mortar and pestle granulation)) to achieve a desired particle size. This step can be achieved with the aforementioned self-milling process, such as represented in FIG. 2. The term "self-milling" refers to the fact that the process is performed without any extraneous grinding media to obtain $UO_2$ particles with a high degree of smoothness and sphericity. The rotational speed of the mill and time for self-milling is determined based on the desired particle size, smoothness and sphericity. According to a preferred aspect of the invention, the self-milling process enables the $UO_2$ particles to be sufficiently spheroidized to a desired size range that can be uniformly coated with a BeO powder, which is believed to be essential to yield a continuous BeO additive phase capable of increasing the thermal conductivity of the $UO_2$-based nuclear fuel.

Typical self-milling durations are believed to be about six to twelve hours, depending on the particle requirements. Shorter and longer durations are also foreseeable. Suitable rotational speeds for the mill are believed to be about ten to about forty rpm, though higher and lower speeds are foreseeable. Preferred particle sizes for the $UO_2$ particles are in a range of about 25 to about 500 µm. Notably, smaller grain sizes for the $UO_2$ particles promotes cross-contamination with the BeO phase. Consequently, the $UO_2$ particles can be sieved to remove fines, as well as to limit the maximum particle size of the resulting $UO_2$ powder.

A highly pure and sinterable BeO powder having a limited particle size relative to the $UO_2$ particles is also necessary to achieve a sintering compatibility between the $UO_2$ and BeO phases that is capable of achieving high densities and reducing cross-contamination. Although virtually all volume percentages between about 5 to 100% were evaluated, a BeO volume fraction of at least 10 volume percent is believed to be necessary to obtain a continuous BeO phase surrounding all of the $UO_2$ particles. In particular, 3-D FEM analysis indicated that more than 10% volume percent gives better results on continuous BeO phase. Preferred volume fractions for BeO will depend on the level of thermal conductivity desired and neutronic considerations.

Figure 3:
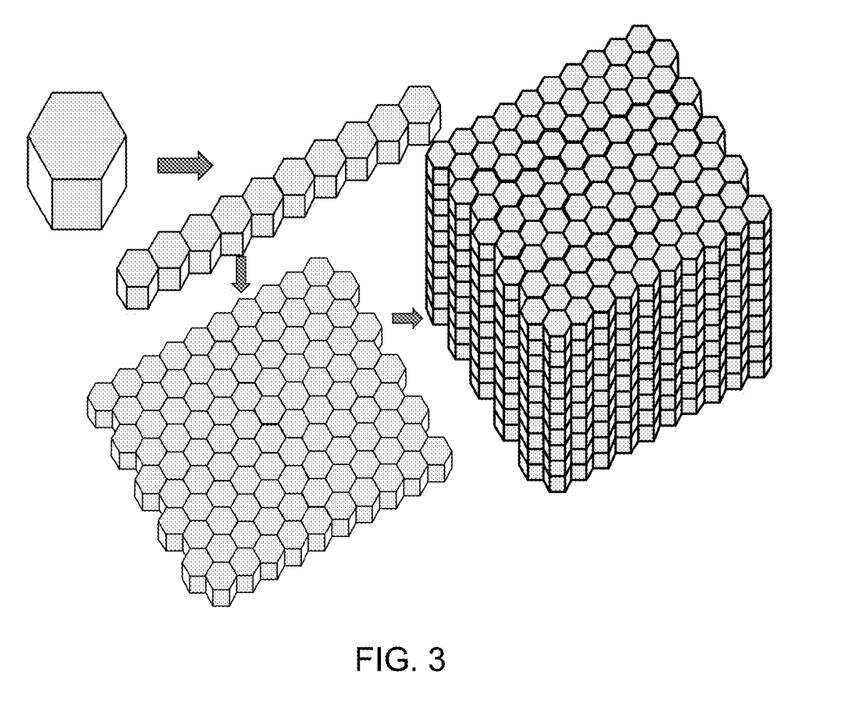
FIG. 3 represents a three-dimensional geometry finite element model (FEM) suitable for performing FEM analysis of $UO_2$—BeO nuclear fuels in accordance with a preferred aspect of the invention.
Figure 4:
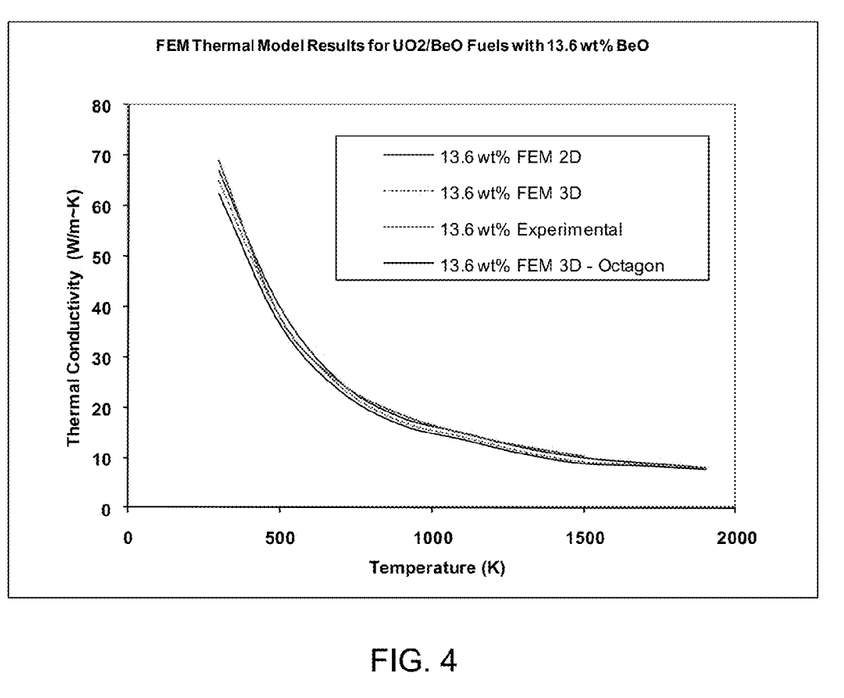
FIG. 4 is a graph that compares results of FEM thermal modeling and actual measured thermal conductivities of $UO_2$/BeO nuclear fuels containing about 13.6 wt % BeO.

FEM analysis was also used to predict theoretical thermal conductivities of $UO_2$—BeO fuels as a function of BeO volume fraction and its distribution. FIG. 3 represents a three-dimensional finite element method that was employed to model a $UO_2$—BeO fuel comprising self-milled $UO_2$ particles mixed with BeO particles. The three-dimensional model is represented as comprising $UO_2$ particles with hexagonal shapes, though both hexagonal and octagonal shapes were used to model the $UO_2$ particles. Octagonal shapes closely approximate the spherical shape of the $UO_2$ particles produced by a self-milling process. In the model, the borders of the hexagonal-shaped $UO_2$ particles are surrounded by BeO particles, and gaps between the hexagonal shapes determine the volume percent of the BeO particles in the matrix. FIG. 4 is a graph that compares results of FEM thermal modeling and actual measured thermal conductivities of $UO_2$—BeO nuclear fuels containing about 13.6 wt % BeO. The data plots evidence that 2-D and 3-D models of the $UO_2$—BeO material compared well with experimental data.

The purity, volume percentage and distribution of the BeO particles in the $UO_2$ phase are major influences for achieving a uniform and continuous BeO coating capable of obtaining suitable thermal conductivities for the $UO_2$—BeO fuel. Finer BeO particles lead to lower open porosity, whereas lower sintered densities and larger open porosities were indicated for presintered particles. To obtain a more optimal microstructure in a $UO_2$—BeO fuel, and in particular an appropriate volume percent and distribution of the BeO particles in the $UO_2$ matrix, an iterative process was employed with 3-D FEM thermal modeling. Volume percentages of BeO were cross-checked with desired neutronic properties for the $UO_2$—BeO fuel, as well as actual thermal conductivity measurements and microstructure examinations. Results of thermal property measurements and microstructure analysis were used to refine the thermal models and identify microstructures capable of optimizing the thermal, mechanical, and neutronic properties of a $UO_2$—BeO nuclear fuel.

A volume fraction of BeO particles identified by the FEM thermal model is then combined with self-milled $UO_2$ particles, after which the mixture is milled, for example, for a duration of about twenty to about forty minutes, though shorter and longer durations are foreseeable. The resultant mixture can be sieved to remove fines, and then pelletized at pressures preferably within a range of about 150 to about 240 MPa. Thereafter, the compacted pellets are sintered, for example, at temperatures ranging from about 1400° C. to about 1700° C. for time periods varying from about four to about twelve hours in a reducing gas environment. Pellets fabricated in this manner exhibit high sintered densities, preferably in the range of about 93% to about 97% of theoretical and with low open porosities typically in the range of about 3% to about 5% by volume. The volume of the interstitial spaces between $UO_2$ particles that are filled with BeO particles and the thickness of the continuous BeO phase will depend on the $UO_2$ particle size and the volume percent and size of the BeO particles.

Figure 5:
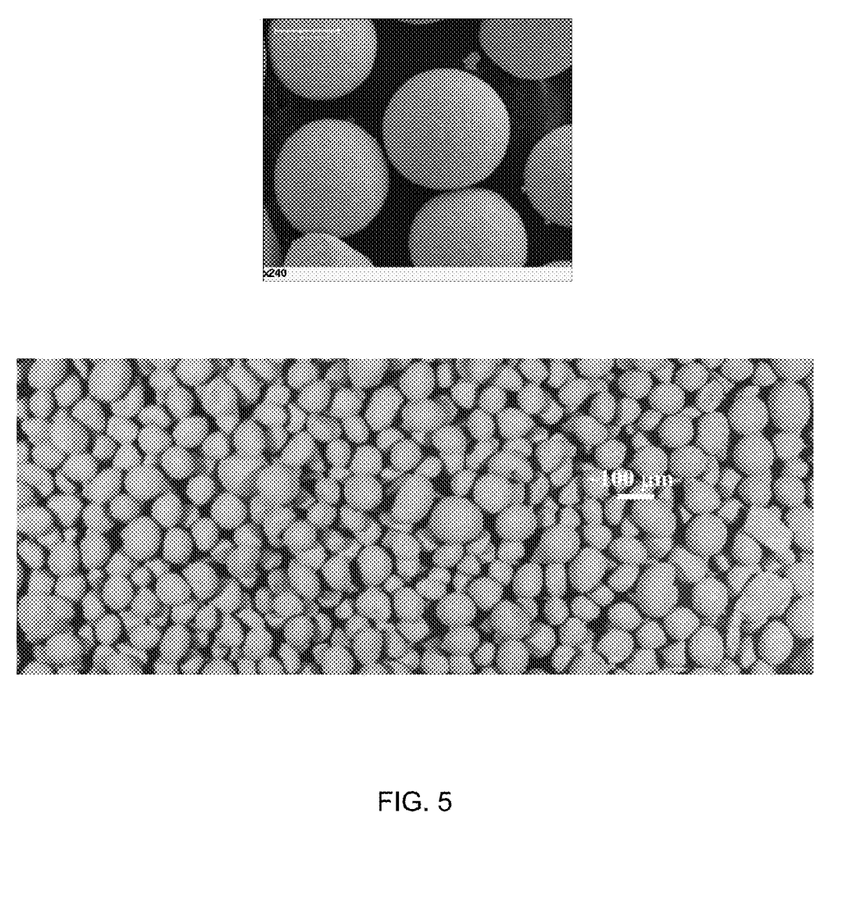
FIG. 5 contains microphotographs of self-milled and sieved $UO_2$ "green" particles (top image), and the same particles mixed with about 10.8 vol. % of a BeO powder (bottom image).

FIG. 5 contains microphotographs of self-milled and sieved $UO_2$ "green" particles (top image) and the same particles mixed with about 10.8 vol. % of a BeO powder (bottom image). FIG. 5 indicates that the BeO powder coated the $UO_2$ particles to form a continuous BeO phase. In accordance with the foregoing discussion, the particles of BeO powder were capable of uniformly coating the $UO_2$ particles, resulting in a uniform coating that completely coats each of the $UO_2$ particles, resulting in a continuous minor phase of BeO surrounding a primary $UO_2$ phase in the sintered pellets.

Figure 6:
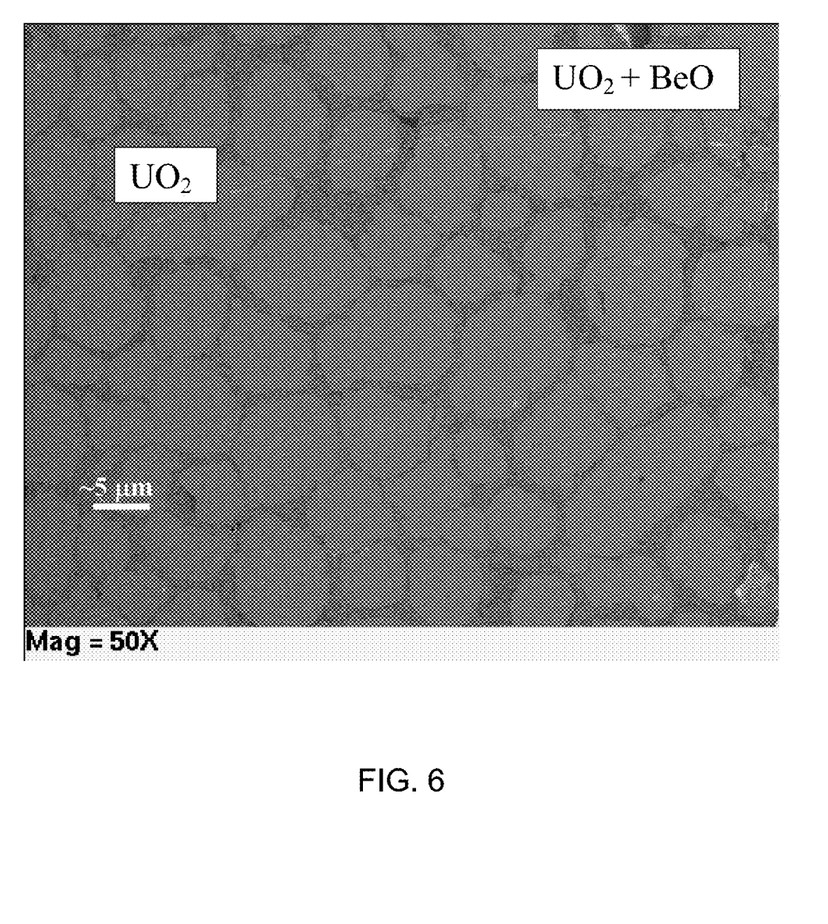
FIG. 6 contains an SEM image of a thermally-etched high density $UO_2$—BeO pellet showing an apparently continuous BeO phase surrounding $UO_2$ particles.
Figure 7:
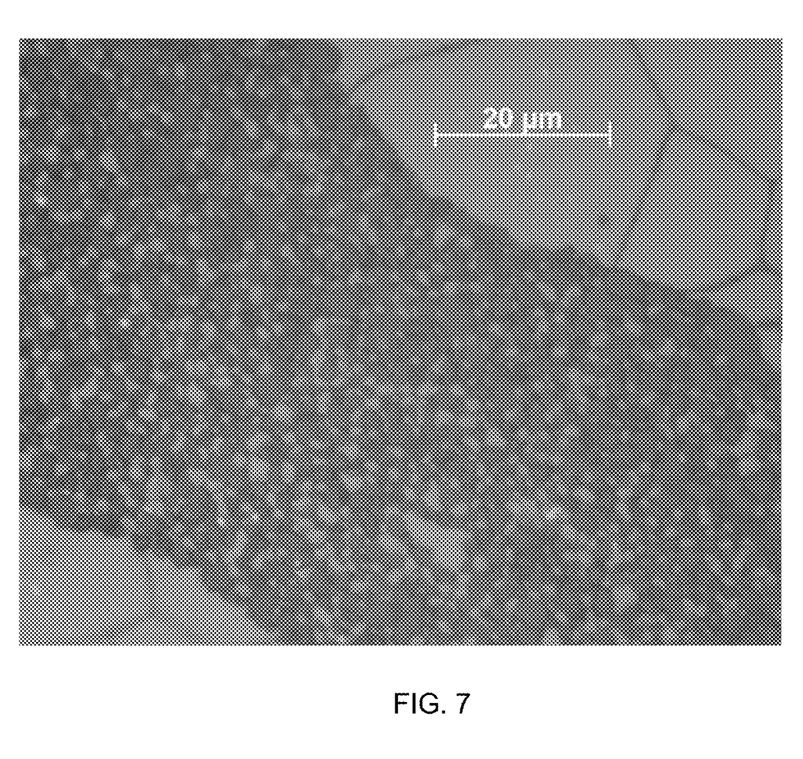
FIG. 7 contains an optical microphotograph of a thermally-etched, high density $UO_2$—BeO pellet fabricated to contain green $UO_2$ particles and a continuous BeO phase that is similar to FIG. 6, but further contains $UO_2$ fragments.

As previously noted, cross-contamination of uranium dioxide in the BeO phase is detrimental. FIG. 6 contains an SEM image of a thermally-etched high density $UO_2$—BeO composite showing an apparently continuous BeO phase surrounding $UO_2$ particles. The BeO phase is essentially entirely BeO. FIG. 7 is an optical microphotograph of a thermally-etched, high density $UO_2$—BeO composite fabricated to contain green $UO_2$ particles and a continuous BeO phase, similar to FIG. 6. However, the BeO phase in FIG. 7 also contains particles of $UO_2$. The darker regions in FIG. 7 are the BeO phase, and the lighter regions are the $UO_2$ phase. The BeO phase seen in FIG. 7 was believed to be cross-contaminated with small $UO_2$ fragments as a result of the BeO—$UO_2$ milling-coating process, during which the $UO_2$ powder particles were abraded. Controlling self-milling rotational speeds and times and greater mechanical strength of the $UO_2$ particles can reduce the amount of $UO_2$ fragments in the BeO phase, which is desirable if thermal conductivity is adversely affected by the presence of $UO_2$ fragments in an otherwise optimized microstructure. Alternatively or in addition, a light presintering of the $UO_2$ particles can be performed to minimize abrasion of the $UO_2$ particles during self-milling, as was done with the UO₂ particles used to produce the composite shown in FIG. 6. In doing so, fewer UO₂ fines resulted that would have eventually appeared as a contaminant in the BeO phase in FIG. 6.

The relative sizes of the UO₂ and BeO particles is also significant from the standpoint that the UO₂ powder has the desirable effect of reducing the BeO sintered particle size, which can affect the BeO stability under irradiation. On the other hand, excessively large UO₂ particles may adversely affect the thermal conductivity of the UO₂—BeO material. Consequently, the ratio of the UO₂ and BeO particle sizes is preferably controlled. From investigations carried out in accordance with the above, it was concluded that particularly good results can be obtained with UO₂—BeO pellets containing about 5 to about 10 volume percent of the continuous BeO phase, and/or UO₂ particles having sizes of about 50 to about 500 micrometers, and/or UO₂ particles and BeO particles having a size ratio of at least 50:1. Furthermore, the particles of BeO and UO₂ are preferably limited to relatively narrow size ranges of about 0.1 to about 10 micrometers (for example, the UO₂ particles might range in size from 50 to 60 micrometers, corresponding to a size range of 10 micrometers). In some embodiments, the UO₂—BeO pellets consist entirely of particles consisting of UO₂ in a continuous phase consisting of BeO, optionally allowing for incidental impurities in each of the UO₂ and BeO phases. In other embodiments, the continuous phase may further contain UO₂, in which case the continuous phase preferably contains at least one volume percent BeO.

While the invention has been described in terms of specific embodiments, it is apparent that other forms could be adopted by one skilled in the art. Accordingly, it should be understood that the invention is not limited to the specific embodiments illustrated in the Figures. For example, nuclear target materials for actinide "burning" or "inert matrix fuels" could also be fabricated as described above. Furthermore, the invention is not limited to the fabrication of nuclear fuels. For example, composites containing two continuous interconnected phases produced as described above may allow one phase to be chemically removed to produce a highly porous body that can be, for example, used as a substrate for catalysis. This capability would allow the UO₂ constituent of nuclear fuel pellets to be recycled into new fuel. Therefore, the scope of the invention is to be limited only by the following claims.

The invention claimed is:

1. A process of producing a ceramic-ceramic composite, the process comprising:
   milling a first ceramic material to produce a powder of spheroidized particles of the first ceramic material;
   co-milling particles of a second ceramic material with the spheroidized particles of the first ceramic material to cause the particles of the second ceramic material to form a coating on the spheroidized particles of the first material; and then
   compacting and sintering the spheroidized particles coated with the particles of the second ceramic material to form the ceramic-ceramic composite in which the second ceramic material forms a continuous phase completely surrounding the spheroidized particles of the first ceramic material; wherein the first ceramic material is uranium dioxide; wherein the sintering step is performed at a temperature within a range of about 1400° C. to about 1700° C.;
   wherein the second ceramic material is beryllium oxide.

2. The process according to claim 1, wherein the first ceramic material is self-milled during the milling step.

3. The process according to claim 1, wherein the particles of the second ceramic material and the spheroidized particles of the first ceramic material are self-milled together during the milling step.

4. The process according to claim 1, wherein the first ceramic material is uranium dioxide, the co-milling step includes co-milling at least 10 volume percent of the particles of the second ceramic material with the spheroidized particles of the first ceramic material, the spheroidized particles of the first ceramic material have particles sizes of 50 to 500 micrometers, and the spheroidized particles of the first ceramic material and the particles of the second ceramic material have a particle size ratio of at least 50:1.

5. The process according to claim 1, wherein the first ceramic material is uranium dioxide, and the ceramic-ceramic composite contains about 5 to about 10 volume percent of beryllium oxide in the continuous phase.

6. The process according to claim 5, wherein the ceramic-ceramic composite consists of uranium dioxide, beryllium oxide, and incidental impurities.

7. The process according to claim 1, wherein the spheroidized particles of the first ceramic material have particle sizes of about 50 to about 500 micrometers.

8. The process according to claim 1, wherein the spheroidized particles of the first ceramic material and the particles of the second ceramic material have a particle size ratio of at least 50:1.

9. The process according to claim 1, wherein the spheroidized particles of the first ceramic material and the particles of the second ceramic material are each limited to a size range of about 0.1 to about 10 micrometers.

10. The process according to claim 1, wherein the continuous phase formed by the second ceramic material does not contain fragments of the first ceramic material.

11. The process according to claim 1, wherein the ceramic-ceramic composite has a density of about 93% to about 97% of theoretical and has open porosity in the range of about 3% to about 5% by volume.

12. The process according to claim 1, wherein the ceramic-ceramic composite is a nuclear fuel.

13. The process according to claim 12, wherein the first ceramic material is uranium dioxide.

14. The process according to claim 12, wherein the first ceramic material is uranium dioxide, the co-milling step includes co-milling at least 10 volume percent of the particles of the second ceramic material with the spheroidized particles of the first ceramic material, the spheroidized particles of the first ceramic material have particles sizes of 50 to 500 micrometers, and the spheroidized particles of the first ceramic material and the particles of the second ceramic material have a particle size ratio of at least 50:1.

15. The process according to claim 12, wherein the first ceramic material is uranium dioxide, and the ceramic-ceramic composite contains about 5 to about 10 volume percent of beryllium oxide in the continuous phase.

16. The process according to claim 12, further comprising installing the nuclear fuel in a nuclear reactor and generating power with the nuclear reactor using the nuclear fuel.

17. The process according to claim 16, further comprising removing the nuclear fuel from the nuclear reactor after generating power with the nuclear fuel, chemically removing the continuous phase of the second ceramic material from the nuclear fuel, and then recycling the first ceramic material into a second nuclear fuel.

* * * * *